March 7, 1967    R. E. GRAVES ETAL    3,308,380
PHASE-STABLE RECEIVER

Filed Nov. 13, 1962    3 Sheets-Sheet 1

ROSS E. GRAVES
DON M. JACOB
JACOB M. SACKS
INVENTORS

BY

AGENT

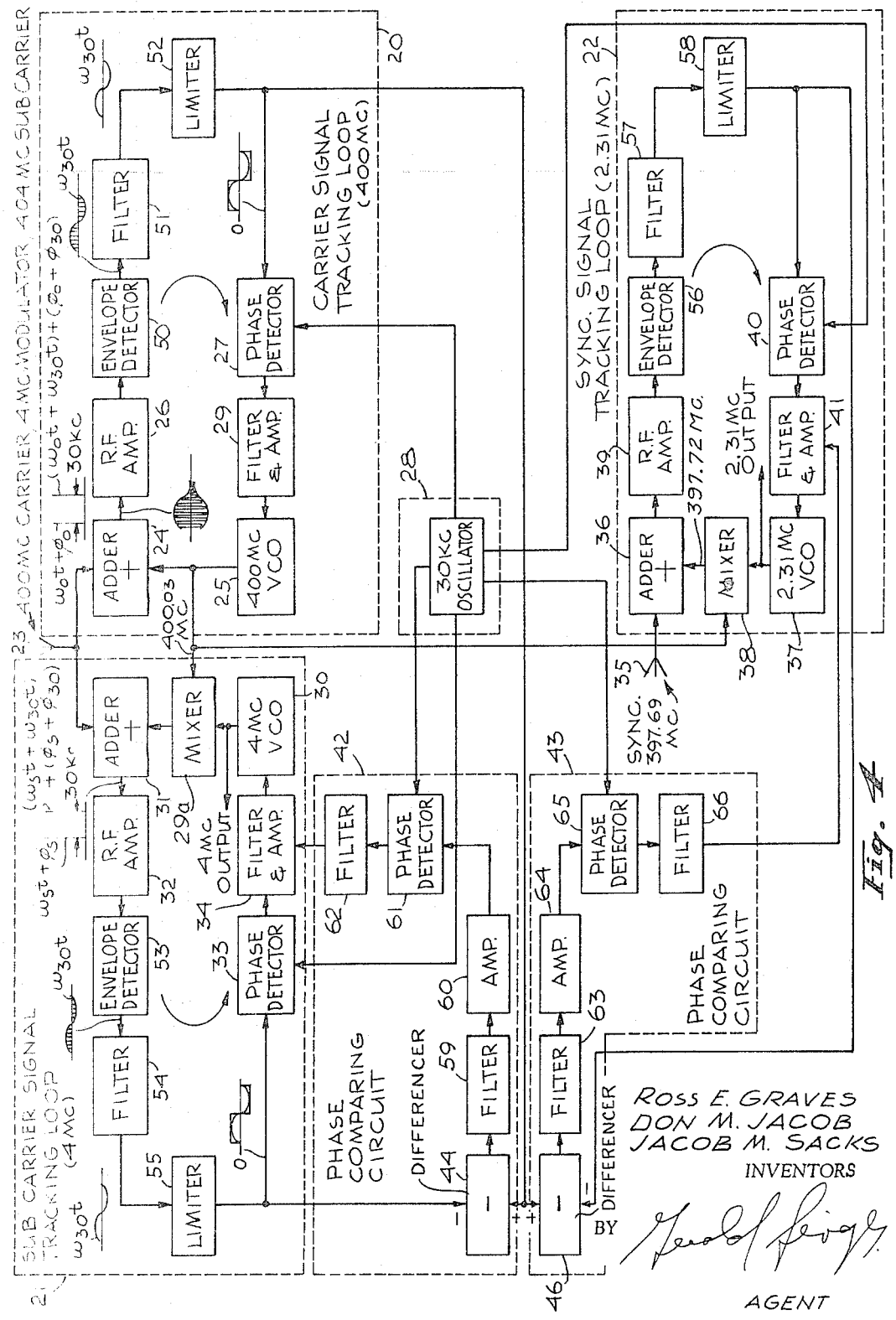

> United States Patent Office 3,308,380
Patented Mar. 7, 1967

3,308,380
PHASE-STABLE RECEIVER
Ross E. Graves, Pacific Palisades, Don M. Jacob, Los Angeles, and Jacob M. Sacks, Palos Verdes Estates, Calif., assignors, by mesne assignments, to TRW Inc., a corporation of Ohio
Filed Nov. 13, 1962, Ser. No. 237,229
15 Claims. (Cl. 325—346)

This invention relates generally to a phase-stable receiver for use in continuous wave (C.W.) Doppler systems.

One of the major problems in the development of precision C.W. guidance and tracking systems is the design and implementation of the tracking receivers. These receivers typically are required to operate over a dynamic range of 80 db. or more while tracking a vehicle travelling at a velocity up to 40,000 ft./sec. with an acceleration as high as 1,000 ft./sec.² The receivers must generally operate down to signal levels as small as −140 dbm. while tracking a vehicle with the aforementioned characteristics. With guidance and tracking systems of the sort contemplated, position and rate measurements are made by means of interferometric techniques, employing system baselines whose lengths may range from a thousand feet to a number of miles. Rate measurements are made by direct use of carrier Doppler data, while position measurements require the use of subcarriers for the resolution of ambiguities in the carrier phase differences measured by pairs of ground receiving stations (angular data) and in the round-trip phase shift from ground-to-vehicle-to-ground (range data). One of the preferred methods is to insert the high frequency subcarriers as single sideband subcarriers on the system carrier while the ranging subcarriers and, possibly, the low frequency angle ambiguity resolving subcarriers may conveniently be frequency (or phase) modulated onto the carrier. In some cases, only one single sideband subcarrier may be employed, and this subcarrier may be swept in frequency or stepped discretely in frequency for the purpose of both range and angle ambiguity resolution.

Regardless of the particular manner in which the subcarriers are modulated onto the carrier, the accuracy with which carrier and subcarrier phase data may be obtained from the tracking receivers is of paramount importance for the operation of the guidance or tracking system. In addition, synchronization of such long baseline systems requires the use of radio links along the baseline paths; and the reception of such synchronizing data requires additional phase-stable receivers. The problem of phase-stabilizing an ultra high frequency (UHF) or microwave receiver is rendered extremely difficult by the combination of requirements, which include large dynamic range, ability to function down to a very low signal level, capability of tracking over a wide range of vehicle velocities and for very large vehicle accelerations, high output signal-to-noise ratios, and very high phase stability, all of which must be satisfied simultaneously. It should be observed that phase accuracy requirements on such receivers may be as stringent as 0.1 electrical degree, while accuracies of a few electrical degrees are required even in those systems for which the phase data accuracy requirements are more lenient.

This invention is concerned with techniques for receiver phase stabilization. The receiver design utilizes techniques which are applicable to any widebase guidance interferometer or to any receiving system having comparable requirements. The receiving system is compatible with both UHF and microwave frequencies; in the microwave case the frequency of the single sideband subcarrier might be as high as several hundred megacycles per second.

In this invention the received signals, which may include a carrier, a single sideband subcarrier, and a synchronizing signal, are each tracked individually in a separate receiving channel. The signals from the three receiving channels are combined to yield the output phase data required. The receiver, actually constructed and incorporating the benefits of this invention, is capable of tracking the carrier alone down to −140 dbm. and both the subcarrier and the carrier from −40 dbm. to −120 dbm., with a maximum source velocity of ±40,000 ft./sec. and a maximum source acceleration of 30 g's. The required tracking accuracy was 5 degrees for the carrier and 0.1 degree for the subcarriers. The phase shifts of the output signals are kept small by using the principles described in this invention.

The receiver does not employ a conventional RF mixer and intermediate frequency (IF) amplifier with automatic gain control (AGC). Instead, phase shifts in the high gain amplifier stages are minimized by injecting a voltage controlled oscillator (VCO) signal, or what would normally be the local oscillator signal. This injected signal is fed to the input of the RF amplifier at a level that is large relative to the received signal and with a prescribed audio frequency offset from the received signal which is small relative to the bandwidths of the amplifying stages. The term "audio frequency" as employed here and in the following discussion is used to emphasize that the offset frequency is low relative to the intermediate frequency which would be employed in a conventional receiver for this portion of the frequency spectrum. In various embodiments this offset frequency could range from as low as several kilocycles to as high as several megacycles. The sum of these two signals, after amplification in the RF amplifier, is detected to obtain an audio frequency beat note (30 kc. in the preferred embodiment). The audio beat note (30 kc.) contains the desired phase information originally on the incoming signal, which is further amplified prior to phase detection with respect to the output of a reference audio oscillator (30 kc.) to obtain an error signal to control the VCO. For certain applications it will prove desirable to heterodyne the output of the RF amplifier to an intermediate frequency for further amplification prior to detection, or even to delete the RF amplifier entirely and perform injection of the VCO signal immediately ahead of the mixer employed to heterodyne the composite signal to the aforementioned intermediate frequency. Use of an IF amplifier in the manner described retains the basic advantages of the RF reference injection technique. By this technique, any phase shifts which are introduced in the received signal by the RF amplifier are compensated by virtually identical phase shifts on the injected RF reference signal, which is offset by the prescribed audio frequency (30 kc.). The result is that any phase error introduced on the received signal in the RF and in the IF amplifier, if employed, is substantially removed by beating the signal against the injected reference in the detector. In the preferred embodiment it was possible to increase the signal to a level 6 db. above the injected reference before significant phase shift occurred, which permitted attainment of additional dynamic range in the receiver for strong signals.

In addition, the injected reference signal power is large relative to the total noise power in the bandwidth presented to the detector, with the result that the signal-to-noise ratio is not degraded by noise-cross-noise products generated in the detector.

Further objects and advantages of this invention will be made more apparent by referring now to the accompanying drawings wherein:

FIG. 4 is a more complete block diagram of the system illustrated in FIG. 2.

The invention is more properly concerned with a phase stable receiver; however, in order to more fully appreciate the application and use of the receiver the invention is also described in connection with a C.W. system requiring a phase stable receiver.

Figure 1:
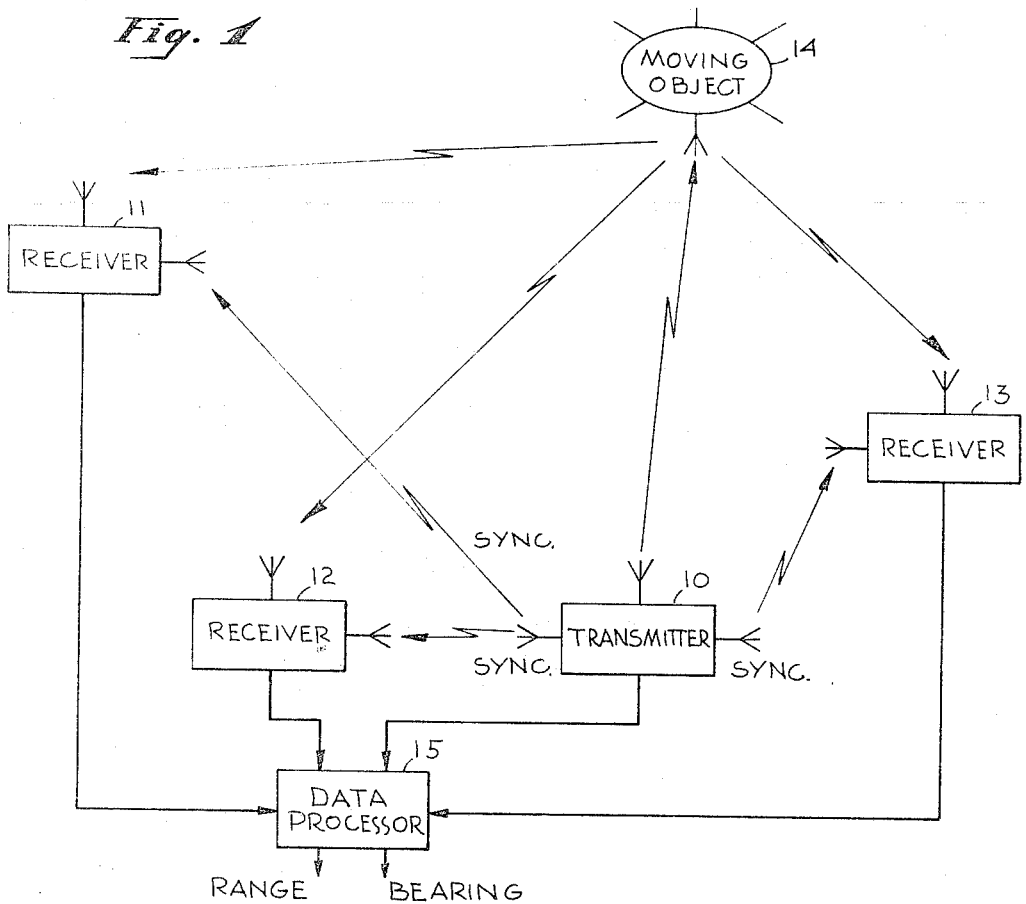
FIG. 1 is a block diagram of a long base line C.W. Doppler system for locating and tracking objects in space.

Referring now to FIG. 1, there is shown a continuous wave Doppler system comprising a transmitter 10 and a plurality of remote receivers 11, 12, and 13. The continuous wave Doppler transmitter 10 is arranged to transmit a C.W. signal to a moving object 14. The moving object may be a satellite or missile and may include a coherent transponder, which is one that receives the transmitted signal from transmitter 10 and rebroadcasts this signal with a frequency offset coherent with the received signal. Alternatively, the moving object may be passive in nature so that it will simply reflect any transmitted signal that impinges upon its surface. The reflected or coherent transmitted signal from the moving object 14 is adapted to be received by all of the receivers 11, 12, and 13. The transmitter 10 is also adapted to transmit a synchronizing (SYNC) signal to all the receivers 11, 12, and 13, which SYNC signal is phase coherent with the C.W. signal transmitted to the moving object 14. The output signals from each of the receivers 11, 12, and 13, together with frequency and timing (phase) information from the transmitter 10, are fed to a data processor 15, consisting of analog and digital data extraction equipment and of computers and associated equipment, which is responsive to the output of said receivers for determining range and bearing information of the moving object 14. Each of the receivers 11, 12, and 13 is identical and is arranged to compare the phase of the carrier signal received from the moving object 14 with the SYNC signal received directly from the transmitter 10. The phase change in each of the receivers is an indication of the relative movement of the moving object 14. The three receivers in this configuration are known as an interferometer and by themselves will produce sufficient information to determine pairs of range differences. In the case where the distance to the moving object 14 is large relative to the separations (baselines) between the receivers 11, 12, and 13, these range differences are substantially equivalent to angular position (bearing) information. The combination of the transmitter 10 with any of the receivers will produce ranging information which, together with the range difference information from the three receivers connected as an interferometer, will produce range and bearing information sufficient to track an object in space.

In one embodiment the transmitter 10 transmits a C.W. carrier signal of 400 mc. with a subcarrier of 404 mc. Each of the receivers 11, 12, and 13 receives reflections of the 400 mc. carrier and 404 mc. subcarrier from the moving object 14. In this case, the phase data of interest are the phase of the 400 mc. carrier and the phase of the 4 mc. subcarrier which is obtained by demodulating the 404 mc. sideband with respect to the 400 mc. carrier. In the following discussion, it will be convenient to refer to both the 4 mc. and the 404 mc. signals as subcarriers, with the understanding that the 404 mc. signal is to be thought of as obtained by single-sideband modulation of the 4 mc. signal onto the 400 mc. carrier. The phases of the 400 mc. received carrier signals and the phases of the received 4 mc. subcarrier signals are compared in pairs in the data processor 15 to determine the range differences previously discussed. Similarly, comparison of the phase of the 4 mc. subcarrier received from the moving object 14 by receiver 12 with the phase of the 4 mc. subcarrier transmitted from transmitter 10, effected in the data processor 15, permits the measurement of (ambiguous) fine range to the moving object 14. The SYNC signal generated by transmitter 10 was fixed at 2.31 mc. below the carrier signal of 400 mc. Each of the receivers is arranged to track the 400 mc. carrier signal, the 4 mc. modulating (subcarrier) signal, and the 2.31 mc. SYNC signal. In a second embodiment of the system described in FIG. 1, the moving object 14 contained a 400 mc. transmitter and 4 mc. modulating source. The transmitter 10 was arranged to transmit a $17/_{16} \times 400$ mc. cw. signal to the moving object 14, which then received the $17/_{16} \times 400$ mc. carrier signal and phase coherently retransmitted the 400 mc. carrier that was modulated by the 4 mc. source located in the moving object. In this embodiment the ground based receivers 11, 12, and 13 performed the same operations as described for the first embodiment. In this case, the received signals from the moving object 14 were at a substantially higher signal level, thereby materially improving the signal-to-noise ratio at the receiver. This system is considered more desirable for the guidance and tracking of friendly objects where suitable transponding equipment may be installed. The principles of the phase stable receiver to be described are the same in either case. It should be observed, however, that when the 4 mc. signal is obtained from a source in the moving object 14, the resultant received 4 mc. phase data cannot be employed for range measurement, as a consequence of the lack of a 4 mc. phase reference in the ground system, even though they are completely satisfactory for measurement of range differences.

The phase-stable receiver receives a carrier signal and modulating signal from the moving object and measures the phase change in the modulating signal by using the carrier signal as a reference. This phase information when received from at least three different ground stations is sufficient to give range difference information. In the preferred embodiment a SYNC signal containing the phase information of the transmitted carrier is also sent to all ground stations in order to obtain range and angle information. By using a carrier frequency of 400 mc. and a modulating frequency of 4 mc., it can be shown that every 360 degree phase change of the 400 mc. carrier is equivalent to 1.23 feet and that every 360 degree phase change of the 4 mc. modulating signal is equal to 123 feet.

It is possible by conventional techniques to measure the phase of the 400 mc. carrier signal to within 5 degrees and the phase of the 4 mc. subcarrier to approximately ½ degree. The accuracies claimed for the system will therefore approximate 0.018 feet for the carrier signal and 0.17 feet for the subcarrier signal. In other words, the 4 mc. subcarrier signal provides unambiguous range information for every 123 feet measured by the 400 mc. carrier signal. Additional range ambiguity can be resolved by amplitude modulating the carrier with a sufficiently low frequency depending upon the maximum range expected. For example, using a 137 cycle signal will provide an unambiguous range of 40,000 feet.

Figure 2:
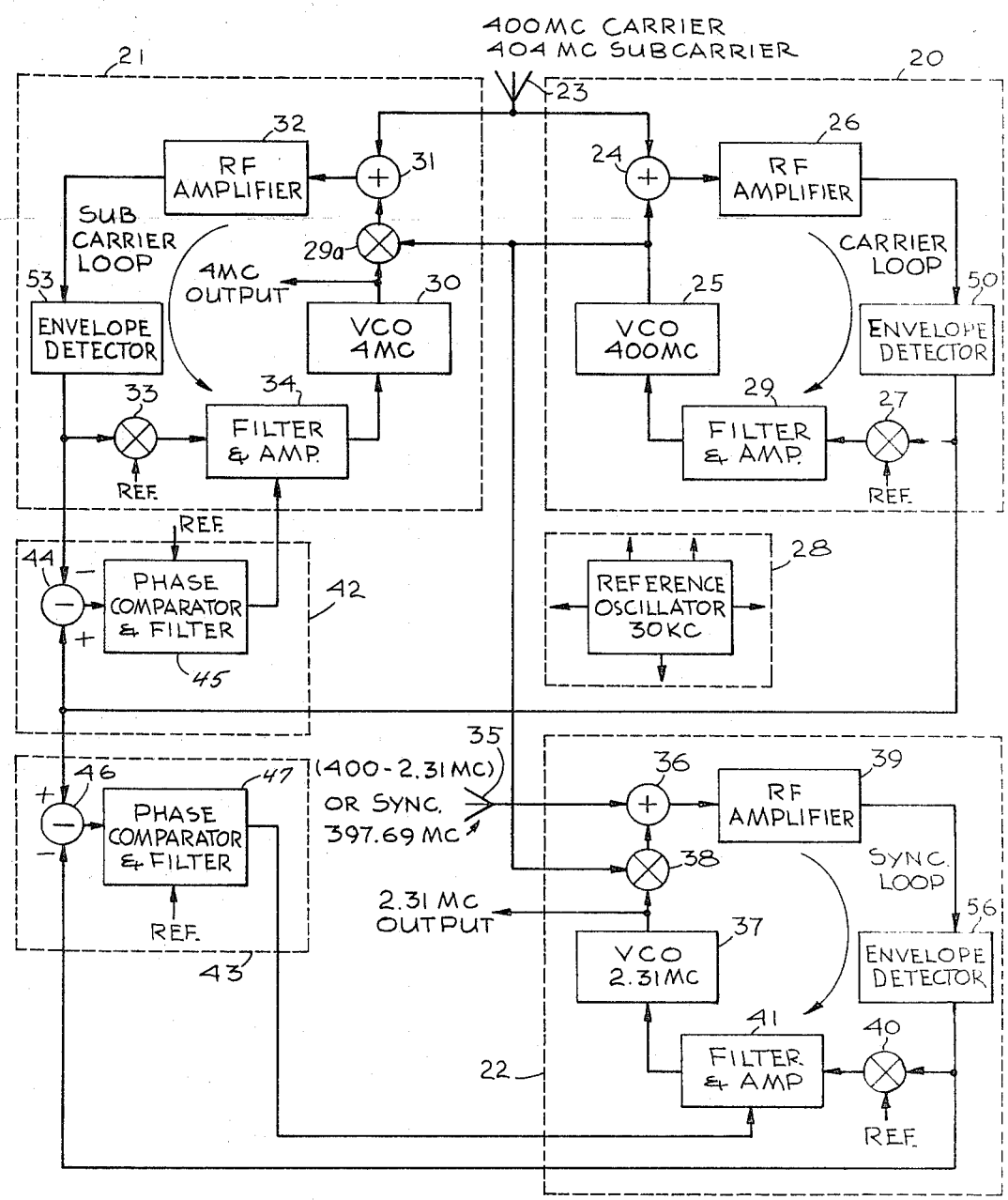
FIG. 2 is a block diagram of a receiver illustrated in the system of FIG. 1.

Referring now to FIG. 2, there is shown a phase-stable receiver adapted to receive a 400 mc. carrier and a 404 mc. subcarrier signal. The receiver comprises a carrier loop 20, a subcarrier loop 21, and a synchronizing loop 22. The improved phase characteristics claimed for the phase-stable receiver are believed due primarily to the use of an RF injected reference signal whose frequency is offset by an audio frequency from the frequency of the received signal. The offset audio frequency was selected in the preferred embodiment to be 30 kc. The injected reference signal is amplified together with the carrier signal and detected to obtain the resultant audio frequency between the carrier signal and the injected reference signal. This technique reduces the effect of phase shifts within the receiver to a very small value since the phase information is contained in the 30 kc. audio offset signal. In the carrier loop 20, the received 400 mc. carrier signal from antenna 23 is fed to an adder 24 where the carrier signal and the injected reference signal from VCO 25 are combined. Both the 400 mc. carrier and the injected reference signal at a frequency of 400 mc.+30 kc. are fed to and amplified in an RF amplifier 26. The output of RF amplifier 26 is fed to an envelope detector 50. The detected 30 kc. beat note is fed to a phase detector 27 where the phase of the 30 kc. audio offset is compared with a reference signal generated by a free running 30 kc. oscillator 28. The output of the phase detector 27 is a D.C. signal which is fed to a filter and amplifier 29 and, then, used to control the frequency of the 400 mc. VCO 25. The loop circuit just described generates an output signal that is offset from the incoming carrier signal by 30 kc. In other words, the carrier loop circuit 20 continuously tracks the difference or 30 kc. audio offset signal, thereby insuring an injected signal that has a fixed frequency offset from the incoming carrier signal.

The subcarrier loop 21 comprises a mixer stage 29a, which is arranged to receive the output signal from the VCO 25 and an output signal from a 4 mc. VCO 30. The output from mixer 29a represents the injected reference signal for the subcarrier loop 21 and is fed to an adder 31, where the injected reference is combined with the received 404 mc. subcarrier from antenna 23. The output from adder 31 is amplified by an RF amplifier 32 and consists at least of the incoming subcarrier at 404 mc. and the injected reference signal at 400.030+4 mc. or 404.030 mc. It can be seen therefore, that in the subcarrier loop 21 RF amplifier 32 is actually amplifying two signals that are only 30 kc. apart, thereby minimizing the phase shift in the loop to a very small value. The output of the RF amplifier 32 is fed to an envelope detector 53. The detected 30 kc. beat note is fed to a phase detector 33, which compares the phase of the detected 30 kc. beat note with the same reference signal generated by the 30 kc. oscillator 28. The output of phase detector 33 is fed to a filter and amplifier 34, the output of which is used to control the frequency of the 4 mc. VCO 30. The output of the subcarrier loop 21 is taken from the output of the 4 mc. VCO 30, which contains the necessary phase information.

For those systems requiring only relative angle information, it is only necessary to compare the phase of this 4 mc. signal against that received by other receiving stations to thereby obtain range difference data for the moving object. For those systems requiring specific location of the moving object, it is necessary to compare the phase of the 4 mc. output signal with the phase of the transmitted subcarrier signal to thereby obtain range information. The combining of the range information together with the range difference data will supply the necessary information to locate the moving object in space.

The SYNC carrier loop 22 supplies the phase information whic is related to the transmitted 400 mc. carrier signal for providing the system with the means for obtaining range and angle information. The 400—2.31 mc. SYNC signal is received from the transmitter by means of antenna 35 and fed to adder 36. The injected reference signal is composed of a first signal from the output of the 400 mc. VCO 25, which is mixed with the output of a 2.31 mc. VCO 37 in mixer 38. The signal from the VCO 25 is actually 400.030 mc., which is mixed with the 2.31 mc. output from VCO 37 in mixer 38. The injected frequency will therefore be 397.72 mc., which will be added to the received 397.69 mc. SYNC signal, which signals are amplified by RF amplifier 39. The output of the RF amplifier 39 is fed to an envelope detector 56. The detected 30 kc. beat note is fed to a phase detector 40 where the 30 kc. beat note frequency is phase compared with a reference signal received from the same 30 kc. oscillator 28. The output of the phase detector 40 is fed to a filter and amplifier 41, the output of which controls the frequency of the 2.31 mc. VCO 37. The 2.31 mc. output frequency contains phase information of the 400 mc. carrier and when used in conjunction with the 4 mc. VCO 30 will produce range and bearing information. A review of the carrier loop 20, the subcarrier loop 21, and the SYNC loop 22 will show that all three loop circuits are locked together and actually lock on the 30 kc. audio offset frequency.

Since each of the defined loop circuits actually tracks a 30 kc. signal, it is important that the phase shift of each loop circuit be the same or very close to being the same as dictated by the ultimate requirements of the over-all system. By using appropriate loop gains in the carrier loop 20, subscriber loop 21, and the SYNC loop 22, the dynamic phase error resulting from acceleration of the moving object may be made nearly identical in all of the defined loop circuits. By keeping the phase error the same for all loops, no resultant error will appear in the output signal. Phase differences between the loops, caused by differential phase shifts in the different tracking loop filter circuits, phase detectors, and filter amplifiers, can be reduced by phase detecting circuits 42 and 43. Phase detecting circuit 42 compares the phase of the 30 kc. beat note signal generated in the subcarrier loop 21 with the phase of the 30 kc. beat note signal generated in the carrier loop 20 by feeding the signals directly to a differencer 44. The output of the differencer 44 is fed to a phase comparator and filter 45, where the signal is compared with a reference 30 kc. signal generated by the 30 kc. oscillator 28. The output of the phase comparator 45 is fed to the filter and amplifier 34 in the subcarrier loop 21, thereby insuring that any phase difference of the 30 kc. beat note signal generated in the carrier loop 20 will be the same as that of the 30 kc. beat note signal generated in subcarrier loop 21. In a similar fashion, the phase of the 30 kc. beat note signal generated in the SYNC loop 22 is compared with the phase of the 30 kc. beat note signal generated in the carrier loop 20 by means of phase detecting circuits 43. The 30 kc. beat note signal from carrier loop 20 and the 30 kc. beat note signal generated in the SYNC loop 22 are fed to a differencer 46. The output of the differencer 46 is fed to a phase comparator and filter 47, where the signal is compared against a reference signal generated by the 30 kc. oscillator 28. The output of the phase comparator 47 is fed to the filter and amplifier 41 in the SYNC loop 22, thereby insuring that the phase of the SYNC loop and the carrier loop will be the same.

The phase detecting circuits 42 and 43 are preferably commutated phase detectors having high gain, low error and low drift. Circuits of this caliber have been disclosed and claimed in copending application, entitled, Precision Phase Detector, Serial No. 226,118, now Patent No. 3,142,804. The feedback signal from phase detecting circuit 42 could have been alternatively directed to the filter and amplifier 29 in the carrier loop 20. This feedback results in a reduction of the initial phase error obtained without the phase detecting circuits by a factor which depends on the gain of the phase detecting circuit.

Figure 3:
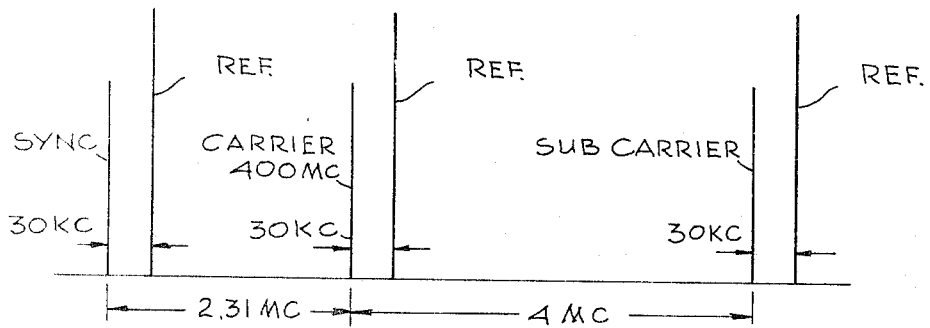
FIG. 3 illustrates the frequency spectrum of the received signals and the injected signals used in the receiver of FIG. 4.

Referring now to FIG. 3, there is shown a frequency spectrum unaffected by Doppler shift, illustrating the received carrier signal at 400 mc. and the subcarrier displaced from the carrier by 4 mc. Also shown is the received SYNC signal which is displaced from the carrier on the low side by 2.31 mc. As mentioned previously, the injected reference signals for the carrier signal, the subcarrier signal and the SYNC signal are each shown displaced from their respective received signal by the audio offset frequency of 30 kc. The relative amplitudes of the injected reference signals are shown in an exaggerated condition to more fully illustrate the increased amplitude of the injected reference signals over the corresponding received signals.

Referring now to FIG. 4, there is shown a block diagram illustrating in more detail the system described in FIG. 2. In describing the more detailed block diagram of FIG. 4, similar numbers used in connection with FIG. 2 will be used whenever the complete block performs the same function as described in FIG. 2. However, wherever additional blocks have been added to more fully describe the function of the system, new numbers will be assigned and used.

In both FIGS. 2 and 4, the 400 mc. and 404 mc. signals are illustrated as being received and separated prior to addition of the injected reference signals for purposes of illustration only and to help understand the invention. It should be noted that whenever two received signals are so close together that the indicated power splitter will produce a 3 db. loss in the desired signal component, thereby degrading the noise performance of the receiving system, this loss may be eliminated by inserting the injected reference signals before any power splitting and then amplifying as shown before envelope detecting the signals.

The incoming carrier signal fed to adder 24 is actually a frequency varying signal having phase information which may be represented as:

$$\omega_0 t + \phi_0$$

The injected reference signal generated by the VCO 25 is locked to the incoming carrier signal and offset therefrom by 30 kc. as previously described and may be mathematically represented as:

$$(\omega_0 t + \omega_{30} t) + (\phi_0 + \phi_{30})$$

Both the incoming carrier signal and the injected reference signal are amplified by the RF amplifier 26. The difference signal containing the phase information is detected by an envelope detector 50. The output of the envelope detector 50 is the 30 kc. offset signal which is fed to a filter 51 to remove the high frequency carrier components. The filtered 30 kc. signal from filter 51 is fed to a limiter 52 for generating a 30 kc. signal at a given amplitude. In the embodiment described the defined limiters 52, 55, and 58 must be extremely phase stable with respect to amplitude. Details of a limiter circuit having the necessary phase stability are described and claimed in a copending application, Serial No. 237,267, filed November 13, 1962, now abandoned, and assigned to the same common assignee. It should be understood, however, that while the limiter technique for performing automatic gain control on the 30 kc. signals represents the preferred embodiment, there are many other techniques that are also suitable. For example, the simple expedient of using an AGC audio amplifier having a phase shifted that varies a small amount with changes in AGC bias. Phase detector 27 compares the phase of the reference 30 kc. oscillator 28 with the limited 30 kc. signal from limiter 52 and generates a pulsating D.C. signal of the proper amplitude and sense as a function of the phase difference between the input 30 kc. signals. The pulsating D.C. output from the phase detector 27 is fed to the filter and amplifier 29 which generates a D.C. signal which is used to control the output of the 400 mc. VCO 25. The output of the VOC 25 will be the injected reference signal having a frequency of 400.030 mc. and a phase given by:

$$(\omega_0 t + \omega_{30} t) + (\phi_0 + \phi_{30})$$

A review of the subcarrier signal tracking loop 21 will show that the 404 mc. subcarrier identified as $\omega_s t + \phi_s$ is fed to the adder 31 together with the injected reference signal which is 30 kc. offset from the subcarrier and identified as $(\omega_s t + \omega_{30} t) + (\phi_s + \phi_{30})$. In a similar fashion, as described for the carrier loop 20, both signals are amplified by an RF amplifier 32 and fed to an envelope detector 53. The detected 30 kc. signal from the envelope detector 53 is fed to a filter 54, which removes the high frequency carrier components and then is fed to a limiter 55. The output of the limiter 55 is compared with the output of the 30 kc. oscillator 28 in the phase detector 33. The pulsating output from the phase detector 33 is fed to a filter and amplifier 34, which generates a D.C. signal varying in amplitude and sense as a function of the difference in phase between the reference signal and the output of limiter 55. This D.C. signal controls the 4 mc. VCO 30. The 4 mc. output from VCO 30 is fed to the mixer 29, which combines the 4 mc. signal with the 400.030 mc. output from the VCO 25, located in the carrier loop 20. The injected reference signal fed to the adder 31 is therefore a 404.030 mc. signal, which is 30 kc. offset from the received 404 mc. subcarrier signal, which is also fed to the adder 31.

The SYNC loop 22 is very similar to the subcarrier loop 21 in that the SYNC signal is received as a subcarrier that is 2.31 mc. removed on the low side of the 400 mc. carrier. This received signal is fed to the adder 36, which also receives the injected reference signal from the mixer 38. Both signals are amplified by the RF amplifier 39 and fed to an envelope detector 56 where the difference signal of 30 kc. of extracted. This signal is fed to a filter 57 and a limiter 58 in the same fashion as previously described. The phase detector 40 generates a pulsating D.C. signal in response to the phase difference between the 30 kc. signal received from the limiter 58 and the 30 kc. reference oscillator 28. The pulsating D.C. signal is fed to the filter and amplifier 41, the output of which controls the 2.31 mc. VCO 37. This 2.31 mc. signal is combined with the 400.030 mc. signal from the VCO 25 and the carrier tracking loop 20 in the mixer 38. The resulting injected reference signal of 397.72 mc. is combined in the adder 36 with the received SYNC signal of 397.69 mc.

The advantage of the defined receiver is that any phase shifts introduced into the carrier, subcarrier, and SYNC signal receiving channels due to Doppler shifts or signal level variations in the RF amplifier and limiter amplifiers, which are of the same magnitude for both channels, will not appear as phase errors in either the 4 mc. subcarrier output signal or in the 2.31 mc. carrier output signal. A further advantage is that the dynamic phase error due to acceleration of the moving object will tend to cancel between the carrier and subcarrier channels (or carrier and synchronizing channels). The dynamic phase error which can result from acceleration of the moving object can be minimized by the proper selection of reference gains in the carrier loop circuit and the subcarrier loop circuit. By making the dynamic phase error exactly the same for each loop, no resultant error will appear in the output signal. In an idealized situation the phase error of each loop can be made identical; however, it is known that active elements in the loop filters, phase detectors and loop filter amplifiers will cause differential phase shifts. It is the purpose of phase detecting circuit 42 to compare the phase shift in the 30 kc. signal in the carrier loop 20 with the phase shift of the 30 kc. signal in the subcarrier loop 21 and in response thereto generate an additional D.C. signal of proper amplitude and sense to thereby make the phase shift of the subcarrier loop 21 the same as the phase shift in the carrier loop 20. The phase detecting circuit 43 performs the same function with respect to the carrier loop 20 and the SYNC loop 22, thereby insuring that all three loop circuits will have substantially the same dynamic lag phase error. In this manner dynamic lag errors in the outputs of the 4 mc. VCO 30 and the 2.31 mc. VCO 37 are substantially eliminated.

The phase comparison circuit 42 comprises a differencer 44 which receives a first input consisting of the limited 30 kc. signal from the output of limiter 52, located in the carrier loop 20, and the limited 30 kc. signal from limiter 55, located in the subcarrier loop 21. The two 30 kc. signals which are of approximately equal magnitude are actually added in antiphase by the differencer 44 prior to being filtered in a bandpass filter 59. The output of the filter 59 is then amplified by an amplifier 60 and phase detected with respect to the output of the 30 kc. oscillator 28 in a phase detector 61. Since the phase detector is only sensitive to a voltage that is in phase quadrature with respect to the initial input signals, it can be shown that the quadrature voltage will arise only when a phase difference exists between the two input signals and will not exist when there is only an amplitude difference. In other words, should the angle between the original input voltage and the phase detector reference voltage and the phase detector reference voltage not be 90 degrees, then any difference in the amplitudes of the signal component from limiter 55 in the subcarrier loop 21 and that from limiter 52 in the carrier loop 20 will produce only a second order effect on the output error signal from phase detector 61. In the preferred embodiment, the defined second order effect is reduced or eliminated by controlling the output amplitude of the last stage of the limiter 55 with an AGC circuit which operates to maintain the amplitude of the signal component of the output of this limiter substantially equal to the amplitude of the signal component of the output of limiter 52. Alternately, this defined second order effect can be reduced or eliminated by means of external circuitry for servoing the phase error so that it is always 90 degrees with respect to the phase detector reference voltage. The pulsating D.C. signal from the phase detector 61 is fed to a filter 62 which generates a D.C. signal varying in amplitude and sense as a function of the phase difference between the carrier loop 20 and the subcarrier loop 21. This D.C. signal is fed to the filter and amplifier 34 where it is combined with the D.C. control signal generated by the subcarrier loop 21, which is ultimately used to control the 4 mc. VCO 30. In this manner the dynamic phase error of the subcarrier loop will be the same as the phase error of the carrier loop. The phase comparing circuit 43 is similar in function to the phase detecting circuit 42. The phase of the carrier loop 20 is compared with the phase of the SYNC loop 22 in order to generate an error signal to thereby cause the SYNC loop to have the same phase lag as the carrier loop 20. The 30 kc. signal from the output of limiter 52 in the carrier loop 20 and the 30 kc. signal from the output of limiter 58 in the SYNC loop 22 are both fed to the differencer 46 located in the phase comparing circuit 43. The difference between these two signals represents an error signal indicating a phase difference between the output of the carrier loop and that of the SYNC loop. This erro signal is fed to a filter 63, which in turn feeds an amplifier 64. The output of amplifier 64 is compared with the output of the 30 kc. reference oscillator 28 by means of phase detector 65. The pulsating D.C. output from the phase detector 65 is fed to a filter 66 which generates a D.C. signal varying in amplitude and sense according to the phase difference between the output of the carrier loop and that of the SYNC loop. The output of the filter 66 is fed back into the filter and amplifier 41, located in the SYNC loop 22. This feedback D.C. signal is combined with the D.C. signal controlling the 2.31 mc. VCO 37 to thereby correct the phase of the SYNC loop output from the 2.31 mc. VCO 37 for dynamic lag phase errors in the carrier loop.

Considerable reduction in the effect of drift in the output of the phase comparing circuits 42 and 43 is obtained as a result of the additional gain from amplifiers 60 and 64, which can be inserted in the signal path prior to the phase detectors without causing saturation. Insertion of this additional gain is possible because of the reduction in input amplitude which is obtained by adding the signals from the limiters 52 and 55 in antiphase and by adding the signals from the limiters 52 and 58 in antiphase. In addition, low drift and very small noise unbalance of the phase detectors can be obtained by means of the commutation technique described in said copending application. The 30 kc. reference of the commutated phase detector may be inverted in phase every 16 cycles, thereby producing a 940 c.p.s. error signal at the output of the phase detector. The peak-to-peak amplitude of this error signal is proportional to the phase error between the two initial input signals from the limiters, and the A.C. component of the phase detector output has one of two phases, depending on the sign of the phase error between the signals from the two limiters. The A.C. component of the phase detector output is amplified and then decommutated in a synchronous clamping circuit. The complete circuit, including the 30 kc. reference commutator, the simple phase detector, and the decommutator is referred to as the commutated phase detector. This commutated phase detector is a very sensitive device having extremely low drift. Because of the high gain employed, the output signal will saturate for only a few degrees of phase difference in the input signals. However, only a few degrees phase error will ever occur at the input to the commutated phase detectors during normal operation of the signal combiner loops, as embodied in the phase comparing circuits 42 and 43.

The practice of adding the two signals at the outputs of the limiters in antiphase and phase detecting the resultant sum with respect to the output of the audio reference oscillator, rather than merely phase-detecting the output of one of the limiters with respect to the output of the other limiter, is employed in order to reduce the level at which thresholding occurs in the phase detector 61 or 65. If the output of one limiter 52 were merely to be phase detected with respect to the output of the other limiter 55, the action of the phase detector would generate noise-cross-noise products, caused by the noise in one channel beating with that in the other channel, which would cause the phase detector to threshold for input signal-to-noise ratios of the order of unity or somewhat below. Moreover, in this case it would not be feasible to perform substantial additional filtering in either or both of the two channels prior to phase detection because of the phase shifts and drifts which would be caused by the required audio filters.

In the present invention the performance of the phase detector is improved since the noisy signal obtained by adding the outputs of the pair of limiters in antiphase is phase detected with respect to a noise-free signal from the reference audio oscillator. This fact implies that, as long as the level of the reference signal is large relative to the total level of the signal-plus-noise in the other phase detector input channel, thresholding caused by noise-cross-noise products will not occur. In addition, after the two noisy signals have been added in antiphase, it is feasible to employ additional gain before phase detection and also to use a narrowband filter to improve the signal-to-noise ratio presented to the phase detector in the signal channel. Any phase shift introduced by the narrowband filter on the sisgnals from the two limiter-amplifiers will be identical and, hence, will produce negligible resultant offset in the phase detector as long as the amplitudes of the signal components in the limiter outputs are well balanced.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. In combination,
   means having phase varying stages for receiving an input frequency varying carrier signal,
   means for adding said carrier signal with an injected reference signal before all of said phase varying stages, said injected reference signal differing from said carrier signal by an audio offset frequency, means for amplifying said carrier signal and said injected reference signal, means for detecting said audio offset frequency from the composite signal comprising said carrier signal and said injected reference signal, phase comparing means responsive to said audio offset frequency and a reference signal from an oscillator having a frequency equal to said audio offset frequency for generating a substantially D.C. signal, and voltage controlled oscillator means being controlled by said D.C. signal for generating said injected reference signal at a frequency differing from said carrier signal by said audio offset frequency and thereby containing the same phase information as said frequency varying input signal.

2. In combination, means having phase varying stages for receiving a frequency varying carrier signal, means for adding said carrier signal with an injected reference signal before all of said phase varying stages, said injected reference signal differing from said carrier signal by an audio offset frequency signal, means for amplifying said carrier signal and said injected reference signal, means for detecting said audio offset frequency signal, phase comparing means responsive to said detected audio offset frequency signal and a reference signal from an oscillator having a frequency equal to said audio offset frequency for generating a substantially D.C. signal, voltage controlled oscillator means being controlled by said D.C. signal for generating said injected reference signal at a frequency differing from said carrier signal by said audio offset frequency, and means for combining said injected reference signal with said carrier signal to produce an output signal varying in frequency and phase as said input signal varies.

3. In combination, means having phase varying stages for receiving an input frequency varying signal, means for adding said frequency varying signal with an injected reference signal ahead of all of said active stages, said injected reference signal differing from said frequency varying signal by an audio offset frequency, means for amplifying said frequency varying signal and said injected reference signal, means for detecting said audio offset frequency from the composite signal comprising said frequency varying signal and said injected reference signal, a reference oscillator generating a substantially fixed frequency reference signal equal to said audio offset frequency, phase comparing means responsive to said audio offset frequency and said reference signal for generating a substantially D.C. signal having amplitude and sense depending on the phase difference between said signals, and voltage controlled oscillator means being controlled by said D.C. signal for generating said injected reference signal at a frequency differing from said frequency varying input signal by said audio offset frequency and thereby containing the same phase information as said frequency varying input signal.

4. In combination, means having phase varying stages for receiving an input frequency varying signal, means for adding said frequency varying input signal with an injected reference signal before all of said phase varying stages, said injected reference signal differing from said frequency varying input signal by an audio offset frequency, means for amplifying said frequency varying input signal and said injected reference signal, envelope detecting means for detecting said audio offset frequency from the composite signal comprising said frequency varying input signal and said injected reference signal, low pass filtering means for removing said input and injected reference signals from said audio offset frequency, gain control means for generating a substantially constant amplitude signal at said audio offset frequency, a reference oscillator generating a substantially fixed frequency reference signal equal to said audio offset frequency, phase comparing means responsive to said amplitude limited audio offset frequency and said reference signal for generating a D.C. signal having amplitude and sense depending on the phase difference between said signals, and voltage controlled oscillator means being controlled by said D.C. signal for generating said injected reference signal at a frequency differing from said frequency varying input signal by said audio offset frequency and thereby containing the same phase information as said frequency varying input signal.

5. In combination, means having phase varying stages for receiving a first and second signal displaced a given frequency from each other and containing desired phase information, a first phase tracking loop comprising means for combining said first received signal with a first injected reference signal ahead of all of said phase varying stages, said first injected reference signal differing from said first received signal by an audio offset frequency, first voltage controlled oscillator means responsive in part to the phase of said first received signal for generating said first injected reference signal, a second phase tracking loop having amplification and detection and comprising means for combining said second received signal with a second injected reference signal before said amplification or detection, said second injected reference signal differing from said second received signal by said audio offset frequency, a second voltage controlled oscillator means controlled in part by the phase of said second received signal for generating said second reference signal, and means responsive to the combining of said first injected reference signal and said second injected reference signal with said first and second signal respectively for obtaining a signal representing the difference between said first and second received signals and thereby containing said desired phase information.

6. A combination according to claim 5 which includes means for controlling and maintaining the dynamic phase error of said first loop and said second loop substantially the same.

7. In combination, means for receiving a first and second signal having a given frequency relationship to each other, a first phase tracking loop comprising means for combining said first signal with a first injected reference signal before amplification or detection, said first injected reference signal differing from said first received signal by an audio offset frequency, first means for amplifying said first received signal and said first injected reference signal, first means for detecting said audio offset frequency from the composite signal comprising said first received signal and said first injected reference signal, first phase comparing means responsive to said audio offset frequency and a reference signal from an oscillator having a frequency equal to said audio offset frequency for generating a first D.C. signal, first voltage controlled oscillator means being controlled by said first D.C. signal for generating said first injected reference signal at a frequency differing from said first received signal by said audio offset frequency, a second phase tracking loop comprising means for combining said second received signal with a second injected reference signal before amplification or detention, said second injected reference signal differing from said second received signal by said audio offset frequency, second means for amplifying said second received signal and said second injected reference signal, second means for detecting said audio offset frequency from the composite signal comprising said second received signal and said second injected reference signal, second phase comparing means responsive to said audio offset frequency and said reference signal for generating a second D.C. signal, and means responsive to said first injected reference signal and second voltage controlled oscillator means being controlled by said second D.C. signal for generating said second injected reference signal at a frequency differing from said second signal by said audio offset frequency.

8. A system according to claim 7 which includes means for differencing said audio offset frequency signal detected in said first loop circuit against said audio offset frequency signal detected in said second loop circuit to produce an error signal, phase comparing means responsive to said error signal and said reference signal for generating a third D.C. signal, and means for feeding said third D.C. signal to said second loop for minimizing said phase error signal.

9. A system according to claim 7 which includes means for differencing said audio offset frequency signal detected in said first loop circuit against said audio offset frequency signal detected in said second loop circuit to produce an error signal, means for amplifying said error signal, phase comparing means responsive to said amplified error signal and said reference signal for generating a third D.C. signal, and means for feeding said third D.C. signal to said second loop for minimizing said phase error signal.

10. A system according to claim 7 which includes means for adding in phase opposition said audio offset frequency signal detected in said first loop circuit against said audio offset frequency signal detected in said second loop circuit to produce a phase error signal, means for amplifying said phase error signal, phase comparing means responsive to said amplified phase error signal and said reference signal for generating a third D.C. signal, and means for combining said third D.C. signal with said first D.C. signal in said second loop to thereby minimize said phase error signal.

11. A system according to claim 7 which includes means for adding in phase opposition said audio offset frequency signal detected in said first loop circuit against said audio offset frequency signal detected in said second loop circuit to produce a phase error signal, means for amplifying said phase error signal, phase comparing means responsive to said amplified phase error signal and said reference signal for generating a third D.C. signal, and means for combining said third D.C. signal with said second D.C. signal for minimizing said phase error signal.

12. In combination, means for receiving a first and second signal having a given frequency relationship to each other, a first phase tracking loop comprising means for combining said first signal with a first injected reference signal before amplification or detection, said first injected reference signal differing from said first received signal by an audio offset frequency, first means for amplifying said first received signal and said first injected reference signal, first means for detecting said audio offset frequency from the composite signal comprising said first received signal and said first injected reference signal, first phase comparing means responsive to said audio offset frequency and a reference signal from an oscillator having a frequency signal to said audio offset frequency for generating a first D.C. signal, first voltage controlled oscillator means being controlled by said first D.C. signal for generating said first injected reference signal at a frequency differing from said first received signal by said audio offset frequency, a second phase tracking loop comprising means for combining said second received signal with a second injected reference signal before amplification or detection, said second injected reference signal differing from said second received signal by said audio offset frequency, second means for amplifying said second received signal and said second injected reference signal, second means for detecting said audio offset frequency from the composite signal comprising said second received signal and said second injected reference signal, second phase comparing means responsive to said audio offset frequency and said reference signal for generating a second D.C. signal, second voltage controlled oscillator means being controlled by said second D.C. signal for generating an output signal having a frequency equal to the frequency difference between said first signal and said second signal, and means for mixing said output signal with said first injected reference signal thereby producing said second injected reference signal.

13. In combination, means for receiving a first signal and a second signal in the microwave region, a first phase tracking loop comprising means for adding said first signal with a first injected reference signal before amplification or detection, said first injected reference signal differing from said first signal by an audio offset frequency, first means for amplifying said first signal and said first injected reference signal, first means for detecting said audio offset frequency from said first signal and said first injected reference signal, first phase comparing means responsive to said audio offset frequency and a reference signal from an oscillator having a frequency equal to said audio offset frequency for generating a first D.C. signal, first voltage controlled oscillator means being controlled by said first D.C. signal for generating said first injected reference signal at a frequency differing from that of said first signal by said audio offset frequency, a second phase tracking loop comprising means for combining said second signal with a second injected reference signal before amplification or detection, said second injected reference signal differing from said second signal by said audio offset frequency, second means for amplifying said second signal and said second injected reference signal, second means for detecting said audio offset frequency from said second signal and said second injected reference signal, second phase comparing means responsive to said audio offset frequency and said audio reference signal for generating a second D.C. signal, second voltage controlled oscillator means being controlled by said second D.C. signal for generating an output signal having a frequency equal to the frequency difference between said first signal and said second signal, and means for mixing said output signal with said first injected reference signal thereby producing said second injected reference signal.

14. In combination, first means for receiving an input frequency varying carrier signal and a subcarrier signal in the microwave region, a first phase tracking loop comprising means for adding said carrier signal with a first injected reference signal before amplification or detection, said first injected reference signal differing from said carrier signal by an audio offset frequency, first means for amplifying said carrier signal and said first injected reference signal, first envelope detecting means for detecting said audio offset frequency from the composite signal comprising said carrier signal and said first injected reference signal, first low pass filtering means for removing said microwave carrier signal from said audio offset frequency, first amplitude limiting means for generating a substantially constant amplitude signal at said audio offset frequency, a reference oscillator generating a substantially fixed frequency reference signal equal to said audio offset frequency, first phase comparing means responsive to said amplitude limited audio offset frequency and said reference signal for generating a first D.C. signal having an amplitude and sense depending on the phase difference between said signals, a first voltage controlled oscillator means being controlled by said first D.C. signal for generating said first injected reference signal at a frequency differing from said carrier signal by said audio offset frequency, a second phase tracking loop comprising means for combining said subcarrier signal with a second injected reference signal before amplification or detection, said second injected reference signal differing from said subcarrier signal by said audio offset frequency, a second means for amplifying said subcarrier signal and said second injected reference signal, second envelope detecting means for detecting said audio offset frequency from the composite signal comprising said subcarrier signal and said second injected reference signal, second low pass filtering means for removing said microwave subcarrier signal from said audio offset frequency, second amplitude limiting means for generating a substantially constant amplitude signal at said audio offset frequency, second phase comparing means responsive to said amplitude limited audio offset frequency and said audio offset signal generated by said reference oscillator for generating a second D.C. signal having an amplitude and sense depending on the phase difference between said signals, a second voltage controlled oscillator means being controlled by said second D.C. signal for generating an output signal having a frequency equal to the frequency difference between said carrier signal and said subcarrier signal, and means for mixing said output signal with said first injected reference signal thereby producing said second injected reference signal.

15. A combination according to claim 14 which includes means for controlling and maintaining the dynamic phase error of said first loop and said second loop substantially the same.

References Cited by the Examiner

UNITED STATES PATENTS

| | | | |
|---|---|---|---|
| 2,405,771 | 8/1946 | Ziegler | 331—25 |
| 2,640,155 | 5/1953 | Rambo | 331—25 |
| 2,684,439 | 7/1954 | Wilmotte | 325—346 |
| 2,906,866 | 9/1959 | Thompson | 325—346 |
| 2,914,732 | 11/1959 | Roth | 331—18 |
| 3,045,114 | 7/1962 | Mindes | 325—433 |

KATHLEEN H. CLAFFY, *Primary Examiner.*

DAVID G. REDINBAUGH, *Examiner.*

R. F. ROTELLA, R. S. BELL, *Assistant Examiners.*